United States Patent
Cho et al.

(10) Patent No.: US 8,326,377 B2
(45) Date of Patent: Dec. 4, 2012

(54) INPUT DEVICE AND MOBILE DEVICE HAVING THE SAME

(75) Inventors: Choong-Hyoun Cho, Seoul (KR); Won Seok Joo, Seoul (KR); Young-Joong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 685 days.

(21) Appl. No.: 11/846,298

(22) Filed: Aug. 28, 2007

(65) Prior Publication Data

US 2008/0227480 A1 Sep. 18, 2008

(30) Foreign Application Priority Data

Mar. 16, 2007 (KR) .................. 10-2007-0026323

(51) Int. Cl.
*H04B 1/034* (2006.01)
*H04B 1/08* (2006.01)
*H04M 1/00* (2006.01)
*H04M 9/00* (2006.01)

(52) U.S. Cl. .................. 455/575.1; 455/575.8; 455/128; 455/347; 379/428.01; 379/440

(58) Field of Classification Search ............... 455/575.1, 455/575.3, 575.4, 575.8, 128, 347; 379/428.01, 379/433.01, 433.06, 433.07, 440
See application file for complete search history.

(56) References Cited

U.S. PATENT DOCUMENTS

| | | | |
|---|---|---|---|
| 5,804,780 A * | 9/1998 | Bartha ........................... 200/5 A |
| 5,805,125 A | 9/1998 | Suganuma et al. |
| 5,867,772 A * | 2/1999 | Jonsson et al. ............. 455/575.1 |
| 6,563,435 B1 | 5/2003 | Platz |
| 6,824,321 B2 | 11/2004 | Ward et al. |
| 7,099,465 B2 * | 8/2006 | Nishi ........................ 379/433.07 |
| 7,405,777 B2 * | 7/2008 | Shimizu ........................... 349/58 |
| 7,612,765 B2 * | 11/2009 | Wernersson .................. 345/168 |
| 7,983,721 B2 * | 7/2011 | Ying et al. .................. 455/575.1 |
| 2003/0098846 A1 | 5/2003 | Lee |
| 2004/0132504 A1 * | 7/2004 | Hague et al. ............... 455/575.1 |
| 2004/0253998 A1 * | 12/2004 | Dunleavy et al. .......... 455/575.1 |
| 2006/0199623 A1 * | 9/2006 | Chan .......................... 455/575.1 |

(Continued)

FOREIGN PATENT DOCUMENTS

EP 1 111 976 A1 6/2001

(Continued)

OTHER PUBLICATIONS

Sadagopan, S., "The Wonder That Is the Mobile," Jun. 30, 2002 (searched on Sep. 15, 2008). In the Internet: <URL: http://www.iiitb.ac.in/ss/FE&20NEW/FE%2026a.htm>.

(Continued)

*Primary Examiner* — Andrew Wendell
(74) *Attorney, Agent, or Firm* — Birch, Stewart, Kolasch & Birch, LLP (57) ABSTRACT

A key button for an input device is provided. The key button includes a button unit formed of a mineral material and a button support member formed of a non-mineral material and connected to the button unit. The button unit has a perimeter and the button support member extends beyond the perimeter of the button unit. A mobile device having at least one key button having a button unit formed of a mineral material and a button support member formed of a non-mineral material and connected to the button unit is also provided.

20 Claims, 5 Drawing Sheets

U.S. PATENT DOCUMENTS

| | | |
|---|---|---|
| 2007/0035962 A1 | 2/2007 | Yurochko |
| 2007/0202933 A1* | 8/2007 | Tolbert et al. .............. 455/575.1 |
| 2008/0019502 A1* | 1/2008 | Emmert et al. .......... 379/433.07 |
| 2008/0227504 A1* | 9/2008 | Chan .......................... 455/575.1 |
| 2009/0054115 A1* | 2/2009 | Horrdin et al. ............. 455/575.8 |

FOREIGN PATENT DOCUMENTS

| | | | |
|---|---|---|---|
| EP | 1 152 443 A2 | | 11/2001 |
| EP | 1 062 675 B1 | | 6/2002 |
| EP | 1 589 404 A1 | | 10/2005 |
| EP | 1722292 A2 | | 11/2006 |
| GB | 2086804 A | | 5/1982 |
| WO | WO 03/021922 | * | 3/2003 |
| WO | WO 03/030499 A1 | | 4/2003 |

OTHER PUBLICATIONS

Wikipedia, "Klebeband", http://de.wikipedia.org/w/index.php?title=Klebeband&oldid=28617897, retrieved on Feb. 22, 2011.

* cited by examiner

INPUT DEVICE AND MOBILE DEVICE HAVING THE SAME

CROSS REFERENCE TO RELATED APPLICATIONS

The present application claims priority to Korean Application No. 10-2007-0026323, filed Mar. 16, 2007, which is herein expressly incorporated by reference in its entirety.

BACKGROUND OF THE INVENTION

1. Field of the Invention

The present invention relates to an input device, and more particularly, to an input device having a mineral button unit, and to a mobile device implementing the same.

2. Description of Related Art

In general, key buttons of current mobile devices are formed of a plastic or metallic material. However, recently mobile device users have demanded designs that focus on making a mobile device that is more aesthetically pleasing. One area that has not received much focus is that of providing a functional, but aesthetically pleasing input device for a mobile device.

BRIEF SUMMARY OF THE INVENTION

Therefore, it is an object of the present invention to provide an input device having at least one key button formed of a mineral material that is aesthetic and decorative, and a mobile device implementing the same.

According to principles of the invention, a mobile device is provided. The mobile device includes a body and an input device located in the body. The input device includes at least one button unit formed of a mineral material, the button unit having a perimeter, and a button support member connected to the at least one button unit, the button support member extending beyond the perimeter of the at least one button unit, and the button support member being formed of a non-mineral material, and a sensor corresponding to the at least one button unit, the sensor being located in the body.

In a further aspect, the mineral material may be one of a ceramic material, a glass material, a crystalline material, and combinations thereof.

In another aspect the button support member may be formed of a flexible material.

In still another aspect, the mobile device may include an adhesive layer connecting the at least one button unit to the button support member.

In a different aspect, the button support member may contact a portion of the body to prevent the button unit from being separated from the body.

In a further aspect, the body may include a plurality of ribs formed therein, the at least one button unit may include a plurality of button units, and the body support member associated with each of the plurality of button units may contact at least one of the plurality of ribs.

In another aspect, the portion of the body may be a recessed portion and the button support member is received in the recessed portion.

In a different aspect, the mineral material may be a brittle material.

In another aspect, the mineral material may be a light permeable material.

In yet another aspect, one of a character, a numeral, and a symbol may be formed on the at least one button unit.

In another aspect, the button support member may be formed in a shape of one of a sheet and a plate.

In a different aspect, the button support member may be formed of a synthetic resin material.

In still another aspect, the mobile device may include a print layer located beneath the at least one button unit, the print layer defining one of a character, a numeral and a symbol visible through the at least one button unit.

In another aspect, the mobile device may include a pad having a protrusion configured to activate the sensor associated with the at least one button unit, the button support layer being located on the pad. The sensor may be a dome switch.

In a different aspect, mobile device may include a display module located in the body, the display module having a screen visible from the exterior of the body. The mobile device may further include a window formed of a mineral material. And a window support member connected to the window and contacting a portion of the body to prevent the window from being separated from the body, the window support member being formed of a material different than the window.

In another aspect, the mobile device may include a decoration unit visible from the exterior of the body, the decoration unit being formed of a mineral material, and a decoration unit support member connected to the decoration unit and contacting a portion of the body to prevent the decoration unit from being separated from the body, the decoration unit support member being formed of a material different than the decoration unit.

According to principles of the present invention, an input device is also provided. The input device includes at least one button unit formed of a mineral material, a button support member connected to the at least one button unit, and a sensor corresponding to the at least one button unit located in the body. The at least one button unit has a perimeter and the button support member extends beyond the perimeter of the at least one button unit. The button support member is formed of a non-mineral material.

In another aspect, the input device may include an adhesive layer connecting the at least one button unit to the button support member.

In a further aspect, the input device may include a pad having a protrusion configured to activate the sensor associated with the at least one button unit and the button support layer may be located on the pad.

The input device may further include the various aspects described above for the mobile device.

According to principles of the invention, a key button for an input device is also provided. The key button includes a button unit formed of a mineral material and a button support member formed of a non-mineral material and connected to the button unit. The button unit has a perimeter and the button support member extends beyond the perimeter of the button unit.

In a further aspect, the button support member may be formed of a flexible material.

In another aspect, the key button may include an adhesive layer connecting the button unit to the button support member.

The key button may further include the various aspects described above for the mobile device.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE INVENTION

Reference will now be made in detail to the preferred embodiments of the present invention, examples of which are illustrated in the accompanying drawings.

Figure 1:
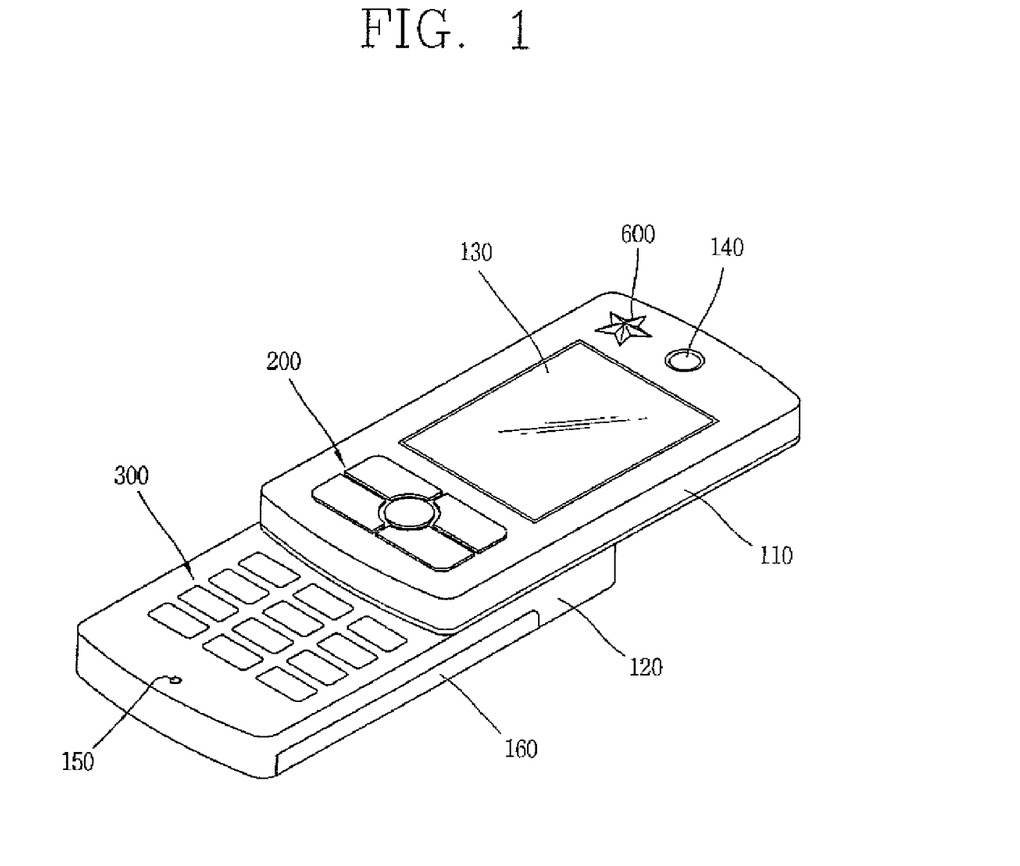
FIG. 1 is a perspective view of a first exemplary embodiment of a mobile device in accordance with the present invention.

FIG. 1 is a perspective view showing an exemplary embodiment of a mobile device 100 in accordance with the present invention. The mobile device 100 includes a first body 110 and a second body 120 slidably connected to the first body 110. A first input device 200 for the inputting of information such as characters, numerals, or symbols by being pressed upon by a user is located in the first body 110. A display 130 for displaying the information inputted by manipulation of the first input device 200 is located adjacent the first input device 200. A speaker 140 for transmitting sound is located above the display 130. A decoration unit 600 may also be provided on the front of the first body 110. While FIG. 1 shows a mobile device as a sliding type device, it is understood that the present invention is not limited to such use. For example, the present invention may also be provided in bar type devices, sliding type devices, swivel type devices, and combinations thereof. In addition, the mobile device is not limited to mobile phones.

A second input device 300 is located in the second body 120. A microphone 150 for inputting sound is located adjacent the second input device 300. A battery 160 is located at a rear surface of the second body 120.

Figure 2:
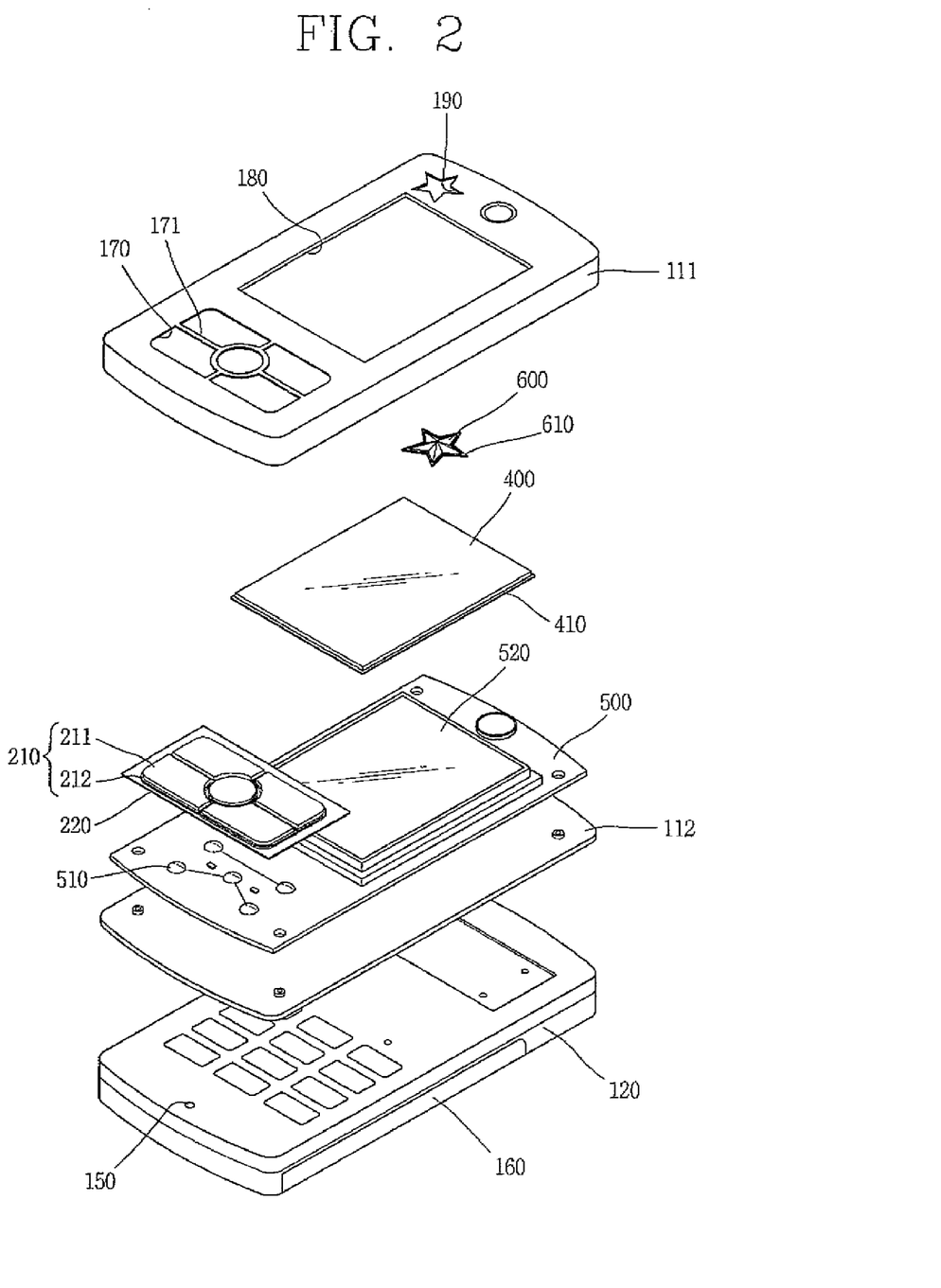
FIG. 2 is a partially exploded perspective view of the mobile device of FIG. 1.

FIG. 2 is a partially exploded perspective view of the mobile device 100 of FIG. 1 showing an inner structure of the first body 110. The first body 110 includes an upper casing 111, a lower easing 112 that is joined with the upper casing 111, and a circuitry supporting substrate (CSS) 500, such as a printed circuit board, located in an inner space between the upper casing 111 and the lower casing 112. The first input device 200, a window 400, and a display module 520, along with other electronic components (not shown) for controlling the mobile device may be located on the CSS 500. Also, the window 400 is arranged over the display module 520 to permit viewing of a screen on the display module 520 through the window opening 180.

A plurality of key button openings 170 is provided in the upper casing 111. The key button openings 170 are partially defined by a pair of engaging ribs 171 separating the key button openings 170, and the engaging ribs 171 are arranged to engage a front portion of the first input device 200. A window opening 180 is also provided in the upper casing 111 and the window 400 is located therein. A decoration unit opening 190 may also be provided in the upper casing 111.

The first input device 200 includes a plurality of key buttons 210, a support pad 220 mounted behind the plurality of key buttons 210 to support the plurality of key buttons 210, and a plurality of switches 510 that are actuatable to input information as each of the corresponding key buttons of the plurality of key buttons 210 is pressed.

The key buttons 210 of the first input device 200 project outward from the first body 110 through the key button openings 170. Each of the plurality of key buttons 210 is engaged with at least one of the engaging ribs 171 that partially define the key button openings 170. The engaging ribs 171 assist in preventing the plurality of key buttons 210 from being separated from the first body 110.

The switches 510 are mounted at a front surface of the CSS 500 that is configured to control the operation of the mobile device 100. The display module 520 that displays the information inputted by use of the first input device 200 or the second input device 300 is mounted adjacent the switches 510. Electronic components (not shown) of the circuitry for controlling and operating the mobile device 100 may be mounted at the rear surface of the CSS 500.

Figure 3:
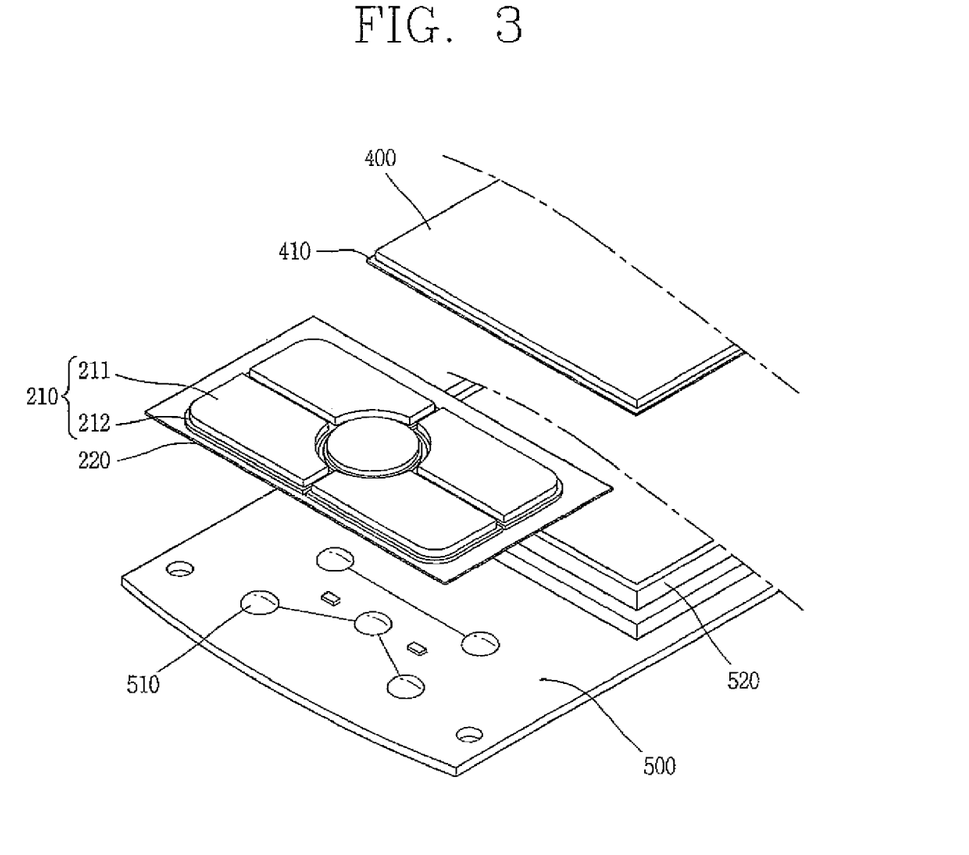
FIG. 3 is a perspective view of an input device and a window in accordance with the present invention.
Figure 4:
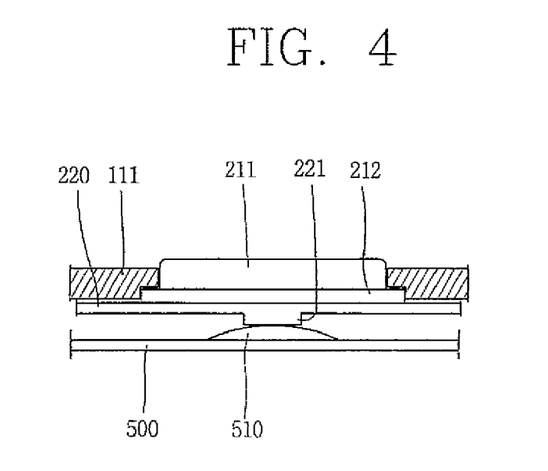
FIG. 4 is a cross-sectional view of the input device of FIG. 3.

Next, the input device 200 and the window 400 will be explained in more detail. FIG. 3 is perspective view showing the input device 200 and the window 400 of in accordance with an embodiment of the present invention, and FIG. 4 is a cross-sectional view showing the input device 200 of FIG. 3.

The first input device 200 includes the plurality of key buttons 210 projecting outwardly from the first body 110 to be pressably-operated, and switches 510 mounted in the first body 110 for the inputting of information as one or more of the plurality of key buttons 210 is pressed.

Each of the plurality of key buttons 210 includes a button unit 211 outwardly exposed through one of the corresponding key button openings 170 formed in the first body 110, and a button support member 212 or key button retaining unit mounted at a rear surface of the button unit 211. The key button retaining unit 212 is configured to engage with the first body 110 for retaining the button unit 211 therein, and preventing the button unit 211 from being separated from the first body 110. As seen in FIG. 3, the key button retaining unit 212 extends beyond the perimeter of the button unit 211.

The button units 211 are formed of a mineral material. The mineral material may include a mixture containing a mineral as well as materials formed of only a mineral itself. For example, there are crystalline mineral materials and also amorphous mineral materials.

Jewels, materials equivalent to jewels and ceramics may be examples of crystalline mineral materials. Glasses and materials equivalent to glasses may be examples of amorphous mineral materials. Particularly when a glass is used as the material for the button unit, it may be desirable to strengthen its solidity by using tempered glass, synthetic glass, lead crystal glass. These glasses are intended to be illustrative and not exhaustive.

The button units 211 may be formed of a light-permeable mineral depending on the desired design. Glasses and jewels, as aforementioned, may correspond to this mineral material. Alternatively, a mineral material that cannot be penetrated by light, such as porcelain, can also be used to form the button units 211. There are many suitable materials that can be used to provide a light-permeable or opaque effect, depending on the desired result.

The key button retaining unit 212 is located at the rear surface of the button unit 211 and may be in the shape of a sheet or a plate, and is larger across than the corresponding key button hole 170, so the button unit 211 may be firmly retained within the first body 110. The key button retaining unit 212 is formed of a non-mineral material different from that of the button unit 211. Particularly, the key button retaining unit 212 may be formed of a synthetic resin material having strength maintainable in the state engaged with the first body 110. For example, Poly Methyl Methacrylate (PMMA), Polycarbonate (PC), or other suitable materials may be used as the material for the key button retaining unit 212.

As seen in FIG. 3, the switches 510 are located at the front surface of the CSS 500 to control the operation of the mobile device. Preferably, the switches 510 are mounted at positions on the CSS 500 corresponding to the location where the button units 211 are located at the front surface of the first body 110.

As noted above, the first input device 200 may include a plurality of key buttons 210 and the pad 220 supporting the plurality of key buttons 210 may be located at the rear surfaces of the plurality of key buttons 210. Operating protrusions 221 may be formed on the rear surface of the pad 220 to press upon the switches 510 and may be located at positions corresponding to the plurality of key buttons 210.

Figure 5:
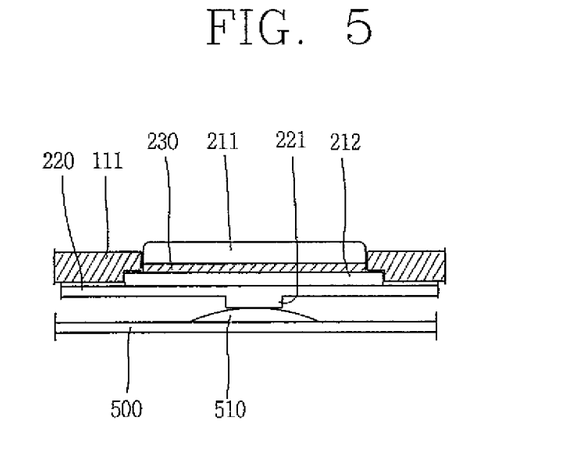
FIG. 5 is a cross-sectional view of another exemplary embodiment of an input device in accordance with the present invention.

FIG. 5 is a cross-sectional view showing an input device in accordance with another embodiment of the present invention. An adhesive layer 230 may be formed between the button unit 211 and the key button retaining unit 212 of the first input device 200 to connect them to each other. Any material capable of maintaining adhesion between the button unit 211 and the key button retaining unit 212 can be used for the adhesive layer 230. For example, an adhesive, such as glue, or a double-sided tape can be used for the adhesive layer 230.

Figure 6:
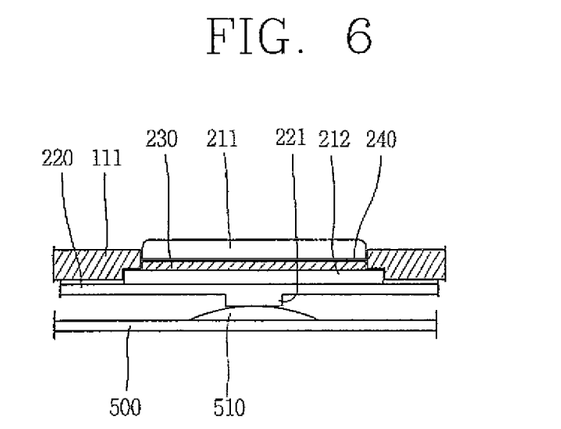
FIG. 6 is a cross-sectional view of another exemplary embodiment of an input device in accordance with the present invention.

As seen in FIG. 6, when the button units 211 are formed of a light-permeable material, a printed layer 240 displaying characters, numeral, and/or symbols may be attached at the rear surfaces of the button units 211. The printed layer 240 may be attached at the upper surface or the lower surface of the adhesive layer 230. Alternatively, when the button units 211 are formed of a material opaque to light, such as porcelain, then characters, numerals, and/or symbols may be directly formed on the button units 211.

While the second input device 300 may be a conventional keypad, it too may be configured similarly to the first input device 200 as described above. The configuration and the functions of the first input device 200 having been described above, no further comment regarding the second input device 300 is necessary.

Figure 7:
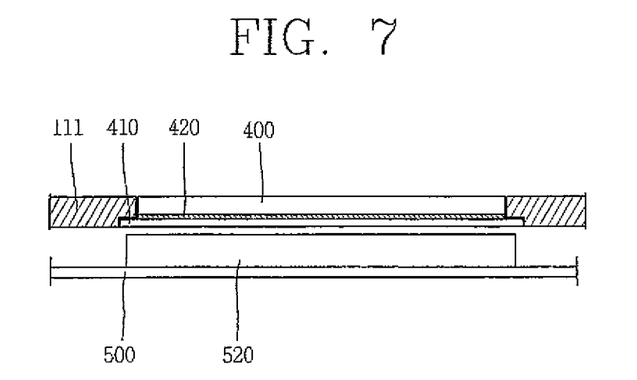
FIG. 7 is a cross-sectional view of the window of FIG. 3.
Figure 8:
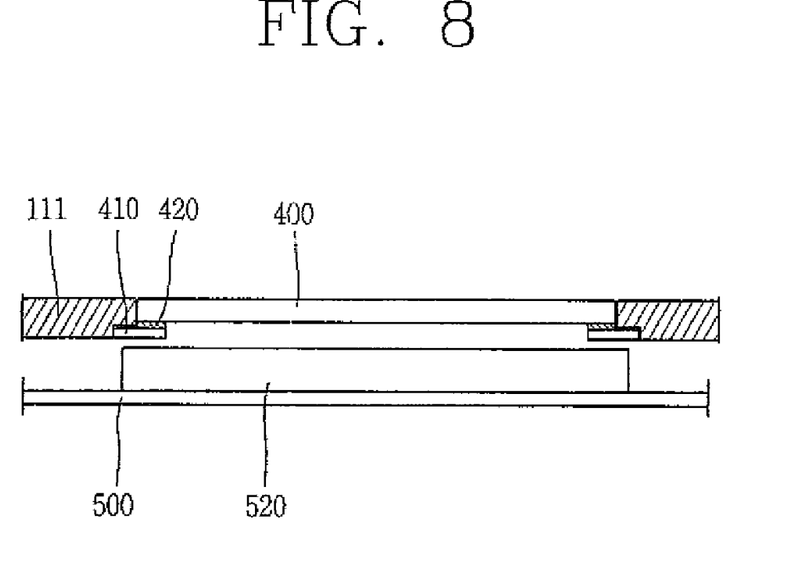
FIG. 8 is a cross-sectional view of another exemplary embodiment of a window in accordance with the present invention.

Turning to the window 400, FIG. 7 is a cross-sectional view showing the window of FIG. 3 and FIG. 8 is a cross-sectional view showing a window in accordance with another embodiment of the present invention.

As in the configuration of the first input device 200, the window 400 is formed of a mineral material. A window retaining plate 410 formed of a material different from that of the window 400 is attached at a rear surface of the window 400. The window retaining plate 410 is engaged with the upper casing 111 to retain the window therein and thereby prevents the window 400 from being separated from the first body 110. The configuration whereby the window 400 is engaged with and retained in the upper casing 111 is similar to that of the first input device 200, and therefore detailed description thereof will be omitted.

Preferably, a transparent material capable of permitting the viewing of information displayed on the display module 520 or a light-permeable material is used for the window 400. And, preferably, an adhesive layer 420 adhering the window 400 and the window retaining unit 410 together is also formed of a transparent material.

The window retaining unit 410 may be formed in the shape of a plate or a sheet, which is adhered to the entire rear surface of the window 400, as shown in FIG. 7; however, it can be also formed to be adhered to only the outer peripheral rear surface of the window 400, as shown in FIG. 8.

Figure 9:
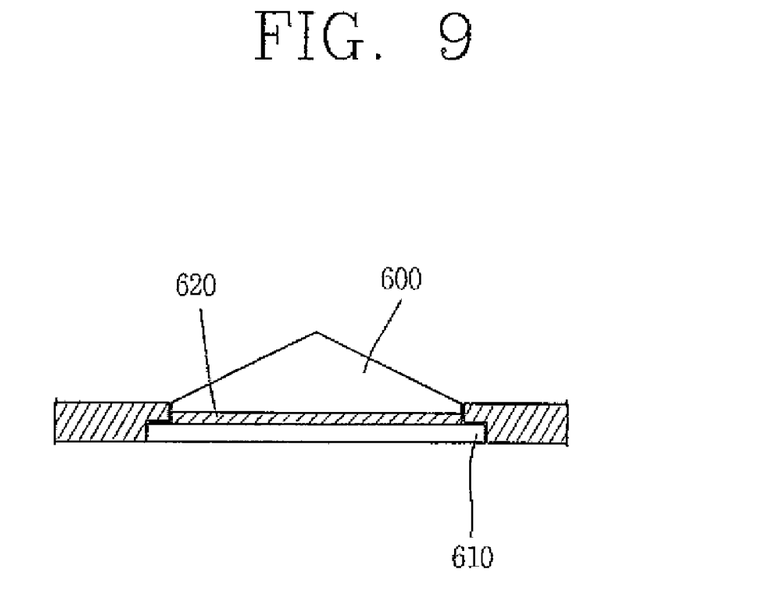
FIG. 9 is a cross-sectional view of the decoration unit of FIG. 1.

A decoration unit 600 for enhancing the decorative appearance of the mobile device 100 is formed of a mineral material and is outwardly exposed from the first body 110. The decoration unit 600 may be located in the first body 110 in the same way as the first input device 200 and the window 400. For example, as seen in FIG. 9, the decoration unit 600 includes a decoration retaining unit 610 that may be attached to the decoration unit 600 by an adhesive layer 620. The configuration whereby the decoration unit 600 is engaged with and retained in the upper casing 111 is the same as that of the first input device 200, and therefore detailed description thereof will be omitted.

The functions of the above-described components of the mobile device in accordance with the present invention will now be described with particular attention to the input device 200 and window 400.

The retaining units 212, 410 are configured so that the button units 211 and the window 400 are retained within the first body 110 and assist in preventing the button units 211 and window 400 from being separated from the first body 110.

In addition, the retaining units 212, 410 are formed of a different material than the button units 211, and window 400, respectively, to improve the resistance to breakage of the button units 211 and window 400. This breakage may occur because of the brittle nature of the mineral materials used or because the stepped profile of the retaining unit 212, 410 with the button units 211, and window 400, respectively, may produce concentrated stresses.

If an adhesive layer 230, 420 is used between the button units 211 and key button retaining unit 212 and between the window 400 and the window retaining unit 410, respectively, the respective button unit 211 and window 400 will remain attached even if they are subsequently fractured or broken. As a result, each of the adhesive layers 230, 420 performs an added function of maintaining the integrity of the button units 211 or the window 400, even if the button units 211 or the window 400 have been broken.

In the input device and the mobile device having the same, the button units of the input device and the decorative unit are formed of a mineral material to provide an aesthetic and decorative aspect.

In addition, even if the button units in the input device or the window are formed of a mineral material, it is still possible to obtain the necessary structure for the input device, while avoiding a complicated shape, thereby providing an input device that is easily manufactured and has a structure which is impact-resistant.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed:

1. A mobile device comprising:
    a body including a case;
    an input device located in the body, the input device including:
        at least one button unit formed of a light permeable material, the button unit having a perimeter;
        a button support member connected to the at least one button unit, the button support member extending beyond the perimeter of the at least one button unit, and the button support member being formed of a non-mineral material;
        a sensor corresponding to the at least one button unit, the sensor being located in the body;
    a display module located to be spaced from the sensor in a lengthwise direction of the main body, the display module having a screen visible from the exterior of the body;
    a window formed of a mineral material being a light permeable material, the window being located opposite the display module, the window having a front surface defining an exterior of the mobile device, and the window having a rear surface opposite the front surface;
    a window support member connected to the window and contacting a portion of the body to prevent the window from being separated from the body, the window support member being formed of a material different than the window; and
    an adhesive layer connecting the window to the window support member, the adhesive layer being located between the rear surface of the window and the window support member,
    wherein the window support member is formed along edges of the window and has a through hole configured to face the display module, and
    wherein the window is disposed at the through hole such that the front surface of the window is exposed to the outside of the mobile device, the window support member is configured to support the rear surface of the window by having a portion of the window support member disposed beneath the rear surface, and the window support member is directly mounted at the case.

2. The mobile device according to claim 1, wherein the mineral material is one of a ceramic material, glass material, crystalline material, and combinations thereof.

3. The mobile device according to claim 1, wherein the button support member is formed of a flexible material.

4. The mobile device according to claim 1, wherein the button support member contacts a portion of the body to prevent the button unit from being separated from the body.

5. The mobile device according to claim 4, wherein the body includes a plurality of ribs formed therein, the at least one button unit includes a plurality of button units, and the body support member associated with each of the plurality of button units contacts at least one of the plurality of ribs.

6. The mobile device according to claim 4, wherein the portion of the body is a recessed portion and the button support member is received in the recessed portion.

7. The mobile device according to claim 1, wherein the mineral material is a brittle material.

8. The mobile device according to claim 1, wherein one of a character, a numeral, and a symbol is formed on the at least one button unit.

9. The mobile device according to claim 1, wherein the button support member is formed in a shape of one of a sheet and a plate.

10. The mobile device according to claim 1, wherein the button support member is formed of a synthetic resin material.

11. The mobile device according to claim 1, further comprising:
    an adhesive layer connecting the at least one button unit to the button support member, the adhesive layer being in a surface contact with at least one of the at least one button unit and the button support member; and
    a print layer located beneath the at least one button unit, the print layer being disposed above the adhesive layer, the print layer being configured to define one of a character, a numeral, and a symbol visible through the at least one button unit.

12. The mobile device according to claim 1, further comprising a pad having a protrusion configured to activate the sensor associated with the at least one button unit, the button support layer being located on the pad.

13. The mobile device according to claim 12, wherein the sensor is a dome switch.

14. The mobile device according to claim 1, further comprising:
    a decoration unit visible from the exterior of the body, the decoration unit being formed of a mineral material; and
    a decoration unit support member connected to the decoration unit and contacting a portion of the body to prevent the decoration unit from being separated from the body, the decoration unit support member being formed of a material different than the decoration unit.

15. The mobile device according to claim 1, wherein the window is located above the window support member such that the window is supported at the perimeter thereof.

16. The mobile device according to claim 1, wherein a thickness of the window support member is smaller than that of the window in a thickness direction of the body.

17. The mobile device according to claim 1, wherein the portion of the window support member is located between the window and the display module.

18. The mobile device according to claim 1, wherein the case is configured to be outwardly exposed and the window support member is fixedly mounted at the case.

19. The mobile device according to claim 1, wherein the rear surface of the window overlies the window support element.

20. A mobile device comprising:
    a body including a case;
    a display module having a screen visible from the exterior of the body;
    a window formed of a mineral material being a light permeable material, the window being located opposite the display module, the window having a front surface defining an exterior of the mobile device, and the window having a rear surface opposite the front surface;
    a window support member connected to the window and contacting a portion of the body to prevent the window from being separated from the body, the window support member being formed of a material different than the window; and an adhesive layer connecting the window to the window support member, the adhesive layer being located between the rear surface of the window and the window support member, wherein the window support member is formed along edges of the window and has a through hole configured to face the display module, and wherein the window is disposed at the through hole such that the front surface of the window is exposed to the outside of the mobile device, the window support member is configured to support the rear surface of the window by having a portion of the window support member disposed beneath the rear surface.

* * * * *